(12) United States Patent
Maleus

(10) Patent No.: US 7,541,778 B2  
(45) Date of Patent: Jun. 2, 2009

(54) METHOD AND APPARATUS FOR DETECTING WHETHER A LEAD ACID BATTERY IS SULPHATED AND FOR CHARGING SAME

(75) Inventor: Borje Maleus, Jarfalla (SE)

(73) Assignee: Creator Teknisk Utveckling AB, Vikmanshyttan (SE)

( * ) Notice: Subject to any disclaimer, the term of this patent is extended or adjusted under 35 U.S.C. 154(b) by 418 days.

(21) Appl. No.: 10/554,910

(22) PCT Filed: Apr. 28, 2004

(86) PCT No.: PCT/SE2004/000641

§ 371 (c)(1),  
(2), (4) Date: Feb. 10, 2006

(87) PCT Pub. No.: WO2004/098021

PCT Pub. Date: Nov. 11, 2004

(65) Prior Publication Data

US 2006/0132096 A1    Jun. 22, 2006

(30) Foreign Application Priority Data

Apr. 30, 2003   (SE)   .................................... 0301252

(51) Int. Cl.  
    *H02J 7/16*    (2006.01)
(52) U.S. Cl. ................. 320/141; 320/140; 320/157; 320/162
(58) Field of Classification Search ............. 320/140, 320/132, 157, 162  
See application file for complete search history.

(56) References Cited

U.S. PATENT DOCUMENTS

| 5,063,341 | A | | 11/1991 | Gali |
| 5,489,836 | A | * | 2/1996 | Yuen ..................... 320/148 |
| 5,592,068 | A | | 1/1997 | Gregory et al. |

(Continued)

FOREIGN PATENT DOCUMENTS

WO    WO 00/44062    7/2000

(Continued)

OTHER PUBLICATIONS

International Search Report of PCT/SE2004/000641, mailed Jul. 28, 2004.

(Continued)

*Primary Examiner*—Akm E Ullah  
*Assistant Examiner*—Arun Williams  
(74) *Attorney, Agent, or Firm*—Nixon & Vanderhye P.C.

(57) ABSTRACT

A method for charging a battery at a battery charger comprising connection means for connection to the terminals of a battery to be charged, means for detecting a voltage over the terminals of a connected battery, and control means. The method comprises the steps of initiating a burst cycle, wherein a plurality of consecutive voltage burst are applied to a connected battery to be charged, each burst successively lowering the internal resistance of the battery and initiating a charging cycle to charge the connected battery when said burst cycle has been terminated. Furthermore, a method for maintenance charging a battery at a battery charger including detecting a voltage over the connected battery; maintaining the voltage over the battery at a predetermined level for a predetermined period of time; monitoring a battery capacity parameter when said predetermined period of time has elapsed; and applying at least one voltage pulse if said parameter falls below a predetermined threshold level.

6 Claims, 6 Drawing Sheets

U.S. PATENT DOCUMENTS

| | | |
|---|---|---|
| 5,663,629 A | 9/1997 | Hinohara |
| 5,998,968 A * | 12/1999 | Pittman et al. ............... 320/130 |
| 6,127,804 A * | 10/2000 | Oglesbee et al. ............ 320/125 |
| 6,225,789 B1 * | 5/2001 | Yuen .......................... 320/162 |
| 6,252,373 B1 * | 6/2001 | Stefansson et al. .......... 320/106 |
| 6,456,043 B1 * | 9/2002 | Finger ........................ 320/134 |
| 6,707,272 B1 * | 3/2004 | Thandiwe ................... 320/141 |
| 6,867,568 B1 * | 3/2005 | Olson et al. .................. 320/162 |
| 7,265,520 B2 * | 9/2007 | Kosuda et al. .............. 320/149 |
| 7,345,450 B2 * | 3/2008 | Krieger et al. .............. 320/104 |

OTHER PUBLICATIONS

Official Action issued in corresponding European Application No. 06120525.8-2007 dated Jun. 6, 20028.

* cited by examiner

METHOD AND APPARATUS FOR DETECTING WHETHER A LEAD ACID BATTERY IS SULPHATED AND FOR CHARGING SAME

This application is the US national phase of international application PCT/SE2004/000641, filed 28 Apr. 2004, which designated the U.S. and claims priority of SE 0301252-3, filed 30 Apr. 2003, the entire contents of each of which are hereby incorporated by reference.

OVERVIEW

The claimed technology provides a method for charging a battery having a high internal resistance due to sulphating during discharging of the battery and a method of maintenance charging of a battery. A computer readable medium comprising instructions for bringing a computer to perform such methods and a battery charger are also described.

BACKGROUND

During the discharging of a re-chargeable battery, lead-dioxide and sulphuric acid ions are converted to lead-sulphate at the positive plate or electrode of the battery cell and lead and sulphuric acid ions are converted to lead-sulphate at the negative plate or electrode. Correspondingly, lead-sulphate is converted to active material, i.e. lead-dioxide and sulphuric acid ions at the positive plate and lead and sulphuric acid ions at the negative plate, during the charging of the battery. However, this lead-sulphate may form a coating on the plates, which increases the internal resistance of the battery. If the battery has been discharged to a large extent, i.e. the amount of active material has decreased to very low level, which may occur if the battery has been unused for a long period of time, for example, during long-term storage (e.g. a battery of an engine of a boat where the engine has been unused during the winter), the internal resistance of the battery may increase to an extent that the battery cannot be charged using a normal charging cycle. This is due to the fact that the high internal resistance entails that the charging voltage rapidly rises to the normal maximum level, 2.3-2.5 V/cell, or to a total voltage of 14.4-14.9 V, even at small charging currents, which, in turn, entails to that the conversion of lead-sulphate to active material is prevented or that a very low amount of material is converted. For this reason, many conventional battery chargers fail in charging batteries in this condition.

Attempts have been made in order to overcome this severe problem with re-chargeable batteries. One example is chargers and methods at chargers that try to solve this problem by delivering a very low charging current and thereby avoiding this rapid increase of charging voltage. However, for this solution, the charging period inevitably will become very long due to the low current. On the other hand, chargers and methods at chargers have been developed that allow a high voltage over the battery, in some applications even more than 20 V. This solution has the drawback that the battery has to be disconnected from the vehicle or the apparatus during the charging period, since such a high charging voltage may, for example, damage the electronics included in the vehicle or apparatus.

One way to prevent the battery from discharging during long-term storage to the extent that a re-charging of the battery becomes difficult or impossible, is to keep the battery under maintenance charging during the storage period. Commonly, a maintenance charging procedure is performed in accordance with two different methods, float charging and pulse or hysteresis charging.

According to the first method, float charging, the voltage over the battery is set to a lower level, typically 13.2-13.9 V, and the battery is held at a charge level of approximately 100%. This method suffers, however, from an enhanced water segregation, which negatively affects the duration of the battery. Further, the lead-sulphate content, in a valve regulated battery, can be enhanced at the negative electrode, which may increase the lead-sulphate coating of the electrode and thereby increase the internal resistance of the battery.

In accordance with the second method, the voltage over the battery is monitored and if the voltage drops below a predetermined threshold level, typically 12.6-13 V, a voltage pulse is applied. Normally, the charge level of a battery subjected to such a maintenance charging method will be below 100%, i.e. the battery is not completely charged.

Thus, it is a difficult problem to find a method and a charger that provide a fast, reliable, and safe charging of a discharged battery, independently of the levels of active material of the battery, i.e., independently of the internal resistance of the battery.

Further, there is a problem to find a method and a charger that provide a maintenance charging that keeps the battery at a capacity level of 100% or near 100% at the same time as the enhancement of the water segregation is prevented and the lead-sulphate content is kept a low level.

SUMMARY

An object is to provide a method for charging batteries in a fast reliable, and safe way, independently of the levels of active material of the battery.

Another object is to provide an improved method for maintenance charging of a battery, in particular during long-term storage of the battery.

These and other objects are achieved by providing methods and chargers having the features defined in the independent claims.

According to a first aspect, there is provided a method of charging a battery at a battery charger comprising connection means for connection to the terminals of a battery to be charged, and control means. The method is characterised in that it comprises the steps of: initiating a burst cycle, wherein a plurality of consecutive voltage bursts are applied to a connected battery to be charged, each burst delivering an amount of charge to the battery and thereby successively lowering the internal resistance of the battery; and initiating a charging cycle to charge the connected battery when said burst cycle has been terminated.

According to a second aspect, there is provided a method of maintenance charging a battery at a battery charger comprising connection means for connection to the terminals of a battery to be charged, means for detecting a voltage over a connected battery, and control means. The method according to the second aspect is characterised by the steps of: detecting a voltage over the connected battery; maintaining the voltage over the battery at a predetermined level for a predetermined period of time; monitoring a battery capacity parameter when said predetermined period of time has elapsed; and applying at least one voltage pulse if said parameter drops below a predetermined threshold level.

According to third aspect, there is provided a computer readable medium comprising instructions for bringing a computer to perform a method according to the first or the second aspect.

According to further aspect, there is provided a battery charger comprising connection means for connection to the terminals of a battery to be charged, means for detecting a voltage over a connected battery, and control means. The charger is characterised in that said control means is connected to the means for detecting, and is arranged to execute the methods according to the first or the second aspect.

The solution according to the first aspect provides several advantages over the existing solutions. The method of charging of a battery, in accordance to the present invention, having a high internal resistance due to sulphating during discharging of the battery is on one hand more rapid compared to the low-current charging method, and, on the other hand, more user-friendly compared to the high-voltage charging method. In comparison with the low-current charging method, the method according to the present invention is significantly more rapid since it uses the conventional current strength and utilises the rise time of the voltage over the battery to successively increase the charge of the battery until that the battery is susceptible for a normal charging cycle. Accordingly, each short interval between connecting and disconnecting of the voltage is used to convert a small amount of active material. When using high-voltage charging method, the battery has to be disconnected from the vehicle or apparatus due to the risk of damaging the electronics. Hence, in comparison with the high-voltage charging method, the method according to the present invention is more user-friendly since the battery can remain connected to the vehicle or the apparatus during the charging since a moderate voltage is used for the charging, preferably 14.4-14.9 V.

Thus, the second aspect is based on the insight of combining float charging and hysteres charging during maintenance charging of a battery. By applying float charging only during an initial, carefully selected period and by initiating hysteres charging after the predetermined period of float charging, the battery can be placed in maintenance charging during a very long period of time, i.e. several months, with a very low water-segregation and at a very high capacity level.

Accordingly, the solution in accordance with the second aspect provides several advantages over the existing solutions. One advantage is that the battery is held at a near maximum charge level, i.e. almost at 100% of the maximum charge of the battery, and can during the maintenance charging be used for applications where full capacity is required.

Another advantage is that the life span of the battery is prolonged since the water segregation, which negatively affects the life span of the battery, is minimized.

An additional advantage is that the risk of an enhanced lead-sulphate content at the negative electrode, which may increase the lead-sulphate coating of the electrode, is significantly reduced when using the method for maintenance charging a battery.

As realized by the person skilled in the art, the methods may be realized as a computer program or a computer readable medium, preferably within the contents of a battery charger.

These and other advantages, and aspects will become apparent from the following detailed description and from the accompanying drawings.

BRIEF DESCRIPTION OF THE DRAWINGS

FIG. 2*c* shows schematically graphs over voltage/current vs. time and charge vs. time, respectively, during a charging cycle of a battery having an increased internal voltage using the method for charging a battery in.

DETAILED DESCRIPTION

Figure 1:
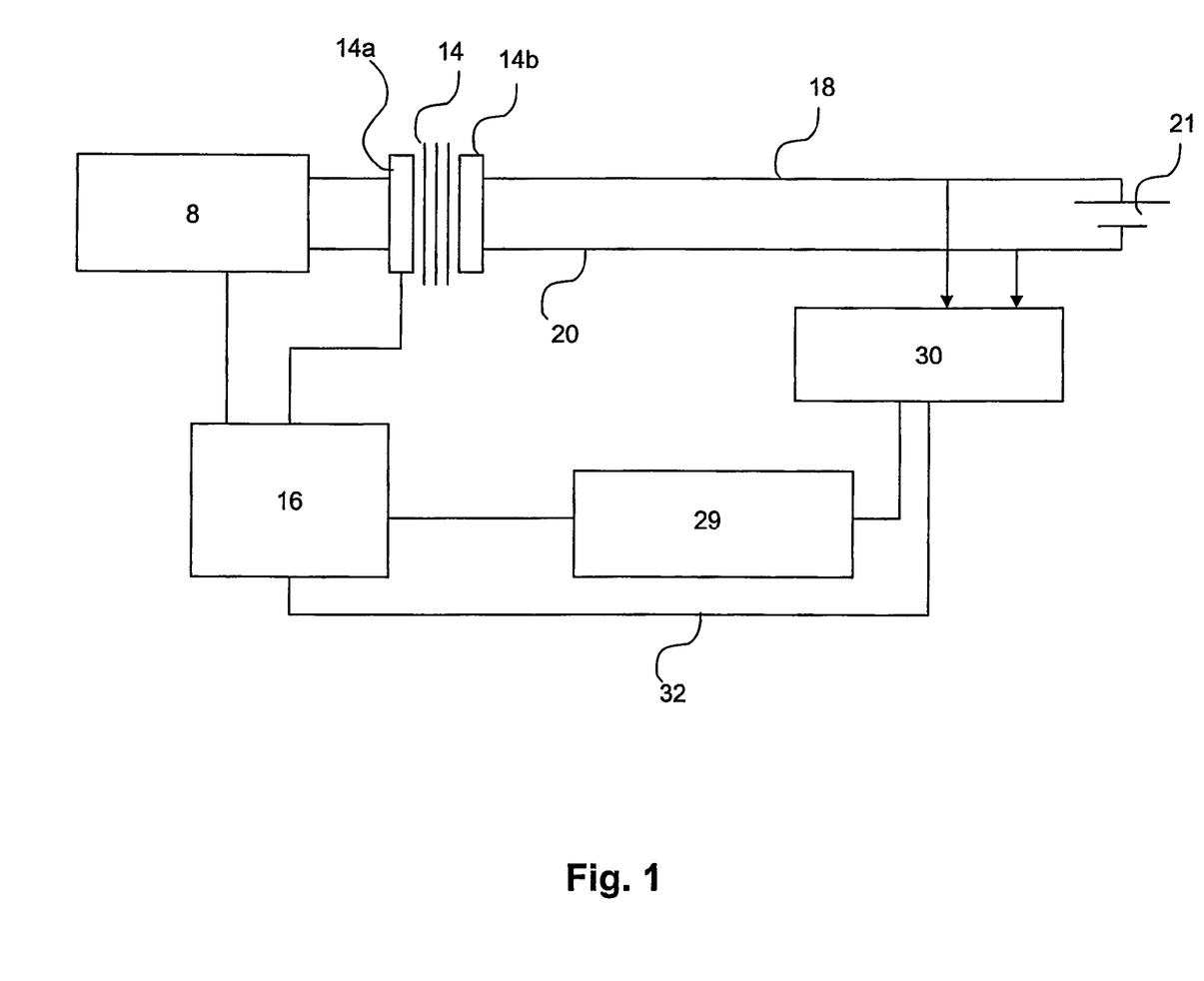
FIG. 1 shows schematically the design of an example embodiment of a battery charger.

With reference first to FIG. 1, a schematic diagram of an example embodiment of a battery charger will be shown, Since the use and structure of a battery charger are well known to the person skilled in the art, only relevant parts or components will be described in detail.

The battery charger shown in FIG. 1 is a primary switched charger comprising in a known manner a DC power circuit 8 connectable to the mains. The DC power circuit 8 comprises, in turn, a diode bridge (not shown), a smoothing capacitor (not shown). Further, the charger comprises a high frequency transformer 14 having a primary winding 14*a* connected to the DC power circuit 8 and a secondary winding 14*b*. The smoothing capacitor stores energy as a high DC voltage. The transformer transforms the high voltage to a charging voltage. A control unit 16 comprising, inter alia, an electronic switch (not shown), like a field effect transistor FET, arranged to the DC power circuit and the transformer capable of chopping up the DC power from the DC power circuit into pulses, and controlling and modulating the signal. Furthermore, the control unit 16 comprises modulation circuitry (not shown) arranged for the modulation of the signal.

On the output side of the high frequency transformer 14 are two lines, positive 18 and negative 20, provided with conductors to connect to a battery 21. A rectifying element (not shown), such as a diode, is arranged to the positive line, and a smoothing capacitor (not shown) is arranged between the positive and negative line.

A control circuit 29, which will be described in more detail below, for controlling the charging process and the maintenance process of the battery charger is connected to the control unit 16 and to a measuring and amplifying circuitry 30 for measuring, detecting and feeding-back of voltage/current. Furthermore, the measuring and amplifying circuitry 30 for measuring, detecting and feeding-back of voltage/current is connected with the positive line 18 and the negative line 20. A feed-back line 32 is provided from the measuring and amplifying circuitry 30 to a modulation circuitry included in the control unit 16 for modulation. The details of the modulation circuitry will not be described in detail here, being well known to the person skilled in the art. Preferably, the signal is modulated using pulse width modulation (PWM). Of course, a number of other modulation methods may be used, for example, pulse-position modulation (PPM) or pulse frequency modulation (PFM). In such cases, any necessary modifications of the circuits of the current device in order to adapt the current device to the modulation method used may be performed by the skilled person and are therefore not described herein. The measuring and amplifying circuitry 30 is also connected to the control circuit for transferring information regarding, for example, the voltage at the terminals of the battery.

Optionally, the control circuit 29 is able to obtain voltage information of the battery and/or the current delivered to the battery connected to the measuring and amplifying circuitry 30 for measuring, detecting and feeding-back of voltage/current. As an alternative, the control circuit 29 can obtain the voltage information of the battery and/or the current directly from the measuring and amplifying circuitry 30 for measuring, detecting and feeding-back of voltage/current. Furthermore, the control circuit 29 is arranged for bringing the control unit 16 to act or respond to control commands based upon the obtained information and memory circuit (not shown). The memory circuit may comprise a non-volatile memory chip (e.g. an EEPROM or FLASH memory chip) which is capable of storing data. The details of the control circuit will not be described in further detail here, because the functions and design of its parts are known to the person skilled in the art.

Of course, there are a number of conceivable designs of the control, circuit. For example, the control circuit can be realized by a processor including, inter alia, programmable instructions for executing the methods described below and in the claims.

Above, a primary switched charger has been described, but the methods described below and in the claims can easily be implemented in other battery chargers, such as linear chargers.

Figure 2A:
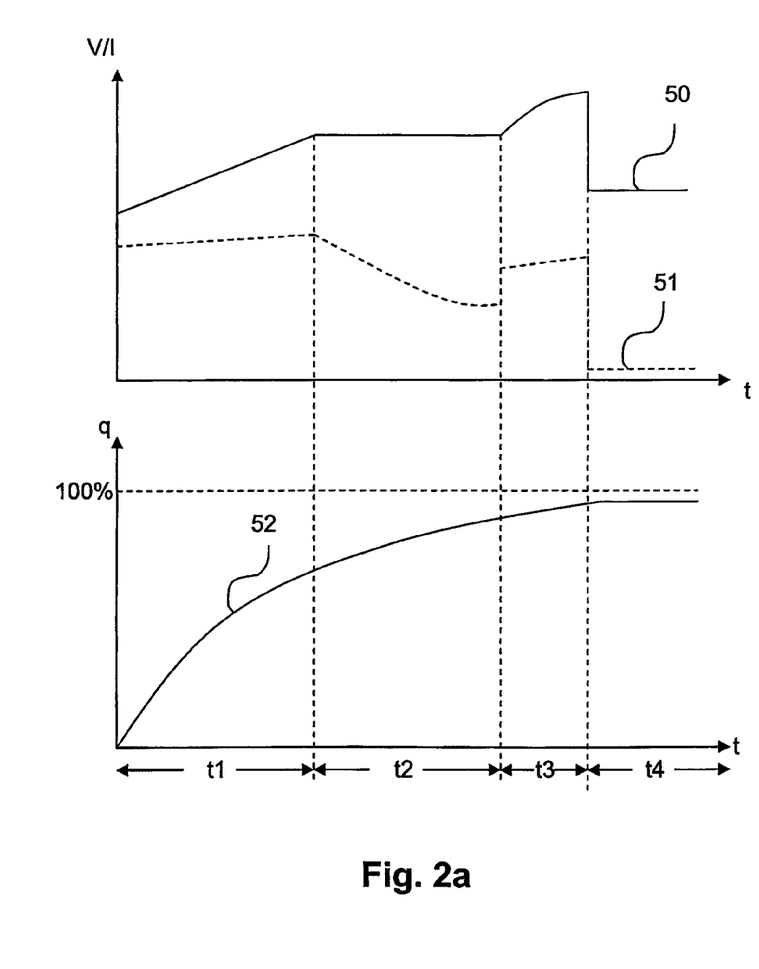
FIG. 2*a* shows schematically graphs over voltage/current vs. time and charge vs. time, respectively, during a normal charging cycle of a battery.

With reference to FIG. 2a, graphs over voltage/current vs. time and charge vs. time, respectively, during a "normal" charging cycle of a battery will be shown. The lines 50 and 51 indicate the voltage and the current, respectively, during a charging cycle of a battery having a "normal" internal resistance, and the line 52 indicates the charge build-up or increase, i.e. the conversion of active material, during the same charging cycle. As can be seen, the voltage 50 rises smoothly and the current 51 is almost constant when the charging is initiated, and the charge is, correspondingly, build-up in a smooth manner. Although the line 51 indicates that the current is almost constant or, in fact, slightly rising, the current may fall during this initial period of time, indicated by t1, in certain cases. The first period of time is denoted as the bulk period and during this period the charging voltage rises to the charge level, which normally is approximately 14.0-14.9 V, and the charge contained in the battery is successively build-up. Subsequently, when the voltage has increased to the charge level, the absorption period, indicated by t2, is initiated during which the voltage is held at this level. During this period the build-up of the charge is continued. In order to bring the charge to 100%, or almost to 100%, of the theoretical battery capacity, a voltage boost may be applied, as indicated by t3, during which the voltage is increased to, for example, approximately 16 V. Thereafter, the battery is nearly fully charged and the maintenance period is initiated, indicated by t4. Preferably, the period t1 has a length within a range from about 1 h to about 20 h, the period t2 has a length within a range from about 1 h to about 40 h, the period t3 has a length within a range from about 15 min. to about 6 h, and the period t4 is unlimited.

Figure 2B:
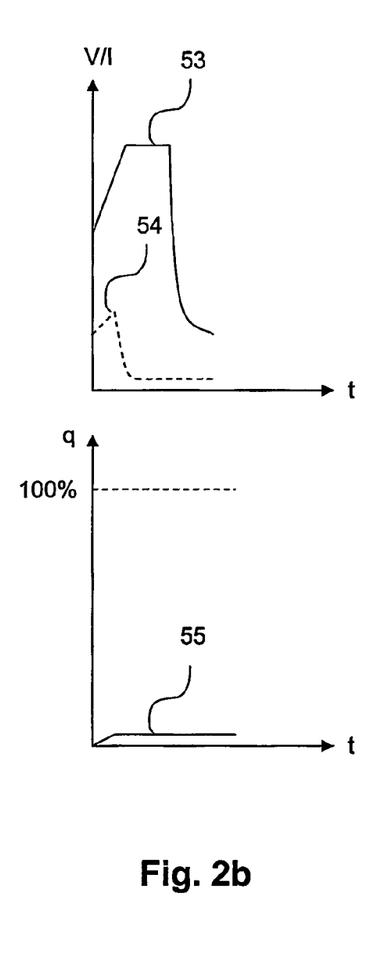
FIG. 2*b* shows schematically graphs over voltage/current vs. time and charge vs. time, respectively, during a charging cycle of a battery having an increased internal voltage.

As a comparison, graphs over voltage/current vs. time and charge vs. time, respectively, during a charging cycle of a battery having an increased internal voltage is shown in FIG. 2b. The lines 53 and 54 indicate the voltage and current, respectively, during the charging cycle, and the line 55 indicates the charge build-up. As can be seen, the rise time of the voltage, see line 53, is very short when the charging voltage is applied to a battery having an increased internal voltage. In other words, the lapse of the increase of the voltage is almost instantaneous due to the high internal voltage. In fact, the rise time will be of the order of a few hundreds of microseconds. Accordingly, the voltage 53 rises rapidly to the maximum level of the battery and, correspondingly, the current 52 falls rapidly, which entails that a very low amount of charge is delivered to the battery, as indicated by the line 55. Thus, as can be seen in FIG. 2b, this rapid process caused by the high internal resistance makes it difficult or even impossible to charge the battery using a conventional battery charger.

Figure 2C:
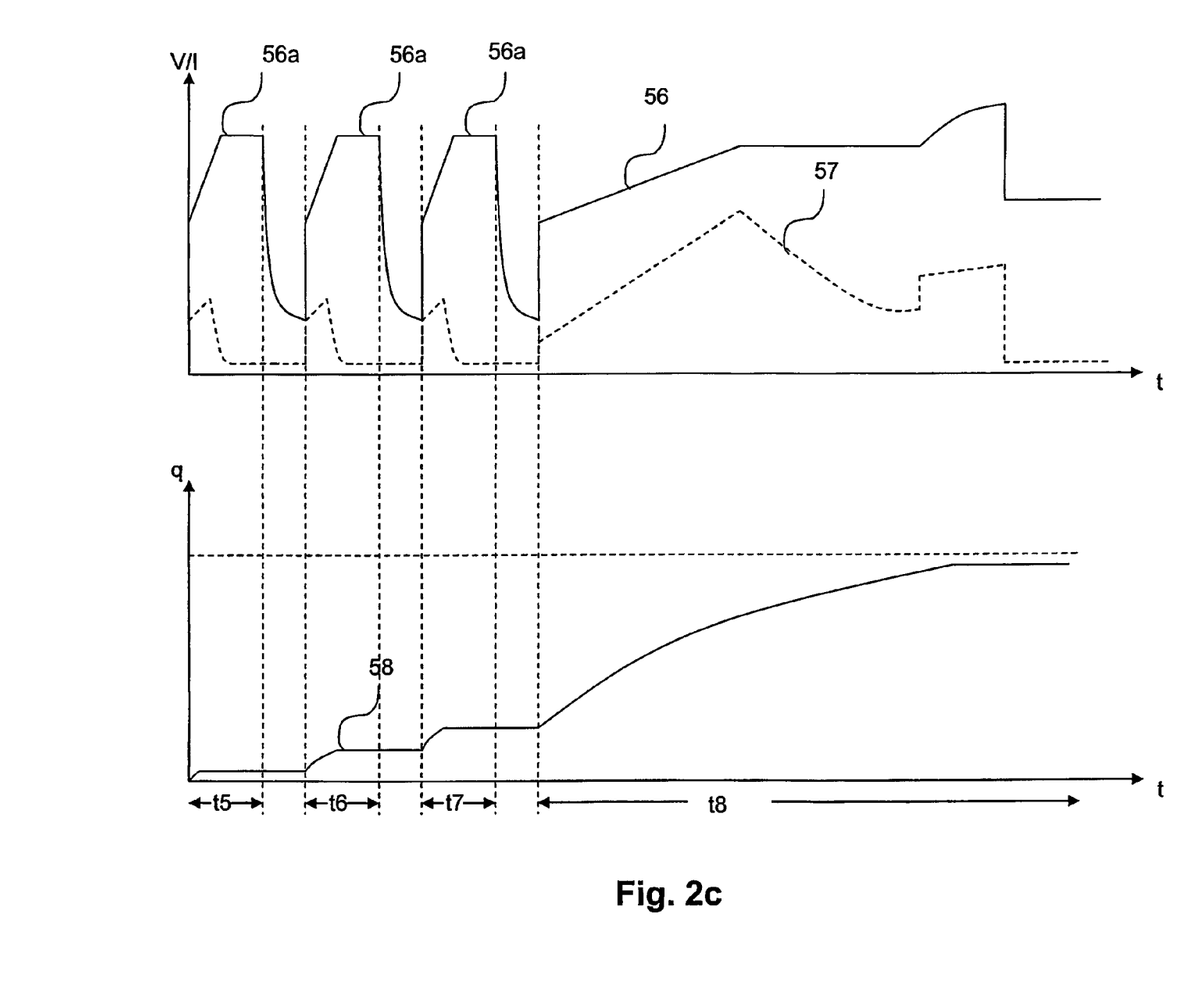

Turning now to FIG. 2c, graphs over voltage/current vs. time and charge vs. time, respectively, during a charging cycle of a battery having an increased internal voltage using the method for charging a battery. The lines 56 and 57 indicate the voltage and the current, respectively, during the charging cycle, and the line 58 indicates the charge build-up during the charging cycle. In accordance with the method for charging a battery having a high internal resistance due to sulphating during discharging of the battery, a number of consecutive voltage pulses or bursts 56a having a duration of t5, t6, and t7, respectively, are applied to the battery. In FIG. 2c only three pulses 56a are delivered, but it should be seen only as exemplifying and in a practical application it may be necessary to deliver a great number of pulses 56a in order to make the battery susceptible for a normal charging procedure. As can be seen in FIG. 2c, the charge, as indicated with line 58 of the battery successively increases with each delivered pulse, and, eventually, the charge of the battery plates has been sufficiently large, i.e. a sufficient amount of charge has been converted, that a normal charging cycle can be applied, indicated by the period of time t8. Concurrently with the decrease of internal resistance of the battery the rise times of the pulses also decreases and the duration of the pulses successively grows longer. Thus, t5 is shorter than t6, which, in turn, is shorter that t7. Each of the periods t5-t7 can have a length in a range from about 50 ms up to several seconds. Moreover, an offset time having a predetermined length can be introduced between consecutive voltage bursts, i.e. an interval period of time between two consecutive voltage bursts. As an alternative, the intervals can have successively increasing or decreasing lengths. It should be noted that the FIGS. 2a-2c only are schematic and that, for example, that the axis indicating voltage, current and charge not are according to scale.

Figure 3:
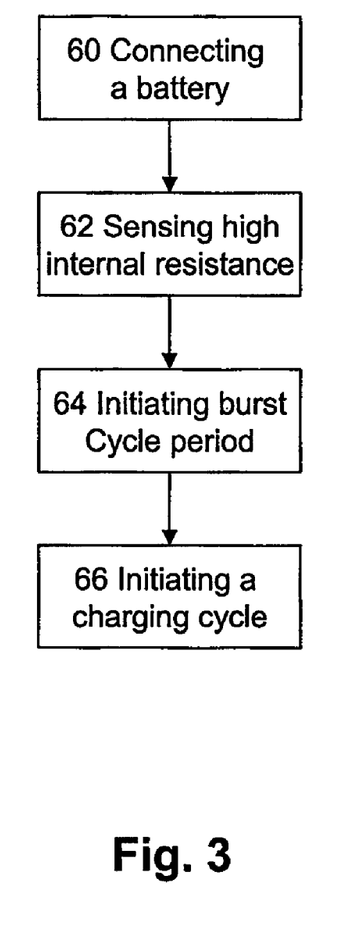
FIG. 3 shows schematically an example embodiment of a method of charging battery having an high internal voltage.

With reference now to FIG. 3, an embodiment of a method of charging battery having an high internal voltage will be described. At step 60, a battery is connected to a battery charger, for example, the charger shown in FIG. 1. Then, at step 62, the charging cycle is initiated, but due to a high internal resistance of the electrode plates of the battery, the voltage over the battery increases rapidly, which is sensed by control circuit 29 by means of the measuring and detecting circuitry 30. This triggers the control circuit 29 to activate a burst cycle period or, in other words, a sequence of consecutive voltage bursts, at step 64, as indicated by 56a in FIG. 2c. In fact, each burst is a start of a "normal" charging followed by a disconnection of the voltage when the current has fallen below a predetermined level. Preferably, this predetermined level is approximately 0.5 A. Thereby, a small amount of charge is delivered to the battery, i.e. a small amount of active material is converted, during each burst. Consequently, the amount of converted active material grows successively. Subsequently, at step 68, it is sensed that the amount of converted material has grown to the extent that a normal charging cycle can be applied and the control circuit 29 initiates a "normal" charging cycle. This is indicated by the fact that the current does not fall below the predetermined level following the applying of the charging voltage.

Figure 4:
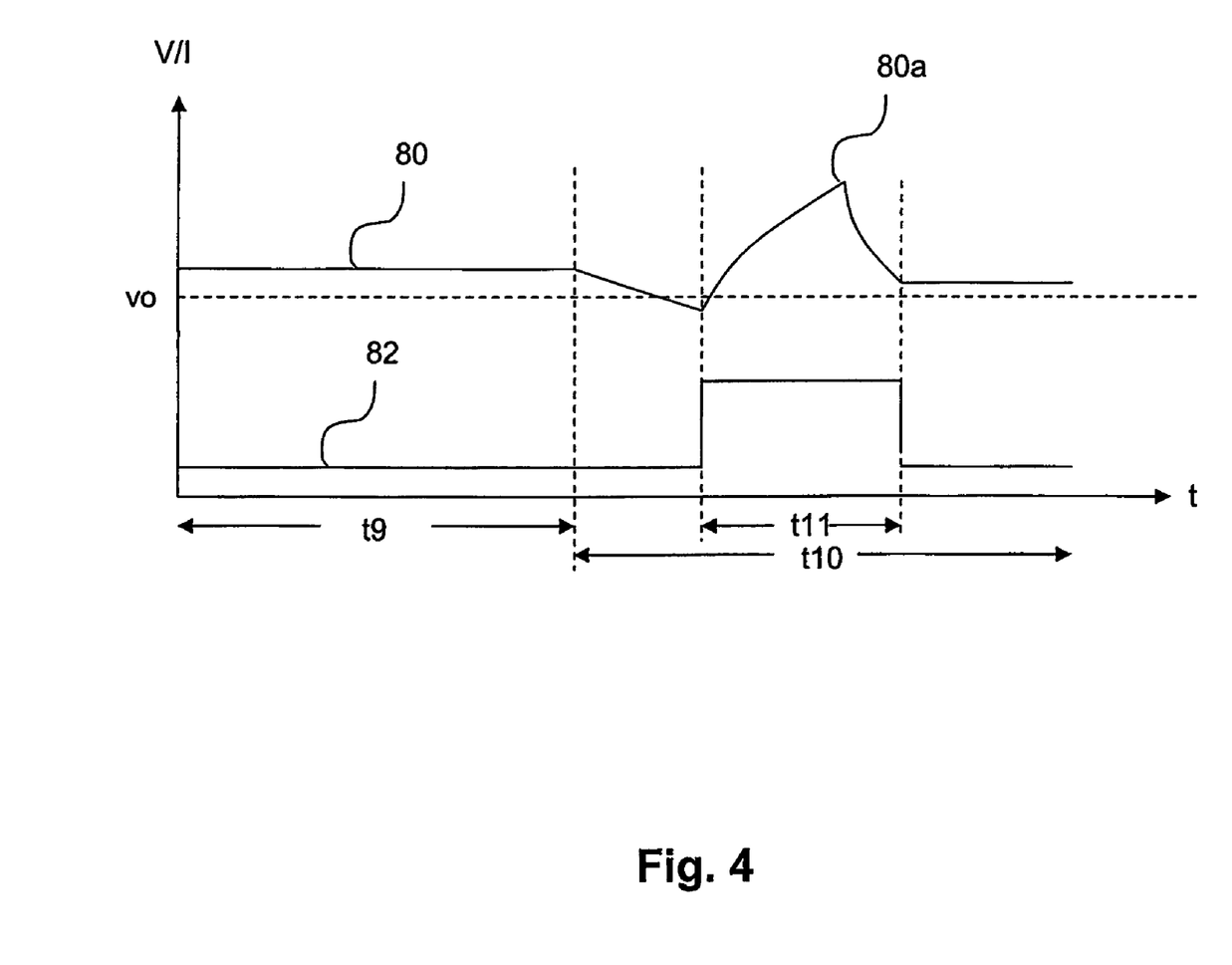
FIG. 4 shows schematically a graph over voltage/current vs. time during maintenance charging of a battery using the method for maintenance charging of a battery.

Turning now to FIG. 4, a graph over voltage/current vs. time during maintenance charging of a battery using the method for maintenance charging of a battery is shown. The lines 80 and 82 indicates the voltage and current, respectively, during the maintenance charging in accordance with an example embodiment of the method for maintenance charging of a battery. During a first period of time t9, when the battery is put at maintenance charging after that the normal charging period has been completed, the voltage over the battery is held at a predetermined voltage level, preferably about 13.2-13.9 V. Further, the voltage level of the battery is approximately at 100% during this period, about 97-98%. This voltage level is maintained during a predetermined period of time, t9, and if the battery is not used during this period, the pulse or hystereses state, t10, will be initiated. This implies that if the voltage falls below a predetermined threshold value or level of battery capacity parameter, which parameter preferably is the voltage indicated by v0 in FIG. 4, one or more voltage pulses will be applied to or delivered to the battery in order to raise the voltage over this predetermined threshold level v0, indicated by a pulse having a duration of t11. The length of t11 depends of, inter alia, the size of the charger, the type of the battery and the condition of the battery. Generally, the period t11 is about 2-15 minutes and the voltage level is preferably 12.6-13 V. The current and voltage during the period t11 are, in principle, similar to a "normal" charging cycle, i.e. first, a constant or almost constant current with a rising voltage and, subsequently, a constant voltage with a falling current. The constant current part is either short, or almost non-existent. In an alternative embodiment a normal charging cycle, see FIG. 2a, is initiated if the voltage falls below the predetermined threshold level of the battery capacity parameter.

In addition, a function can be implemented that lays down conditions so that the current is not allowed to rise above a threshold value, typically 200 mA at a 100 Ah battery. This function is useful, inter alia, in a back-up system. In this case the charger may remain in a float state since a current above this threshold indicates that the device or application connected to the battery constantly draws current of the battery.

Figure 5:
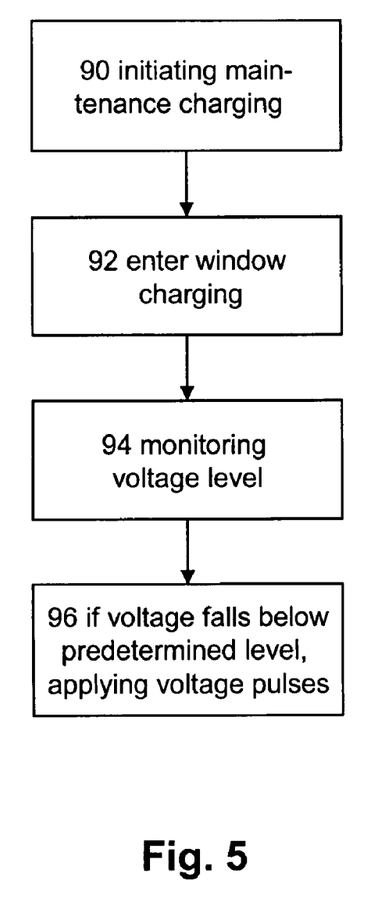
FIG. 5 shows schematically an embodiment of a method for maintenance charging of a battery.

With reference to FIG. 5, an example embodiment of a method for maintenance charging of a battery is described. At step 90, the maintenance charging is initiated by the control means 29 and the voltage over the battery is detected and locked to or held at preferably 13.2-13.9 V. This can initiated either manually by an user of the battery charger or automatically. The period of maintenance charging or float is set or predetermined to, for example, ten days. During this float period the charge of the battery is held at approximately 100% of the capacity level and the battery can be used in application where maximum capacity is required. If the battery is not used during this float period, window charging will be initiated, i.e. a pulse or hysteres period, at step 92. If the battery is used during this period, the charger returns to the float mode. Then, at step 94, the voltage over the battery is monitored or detected and when or if the voltage falls below a predetermined threshold level or value of a battery capacity indicating parameter, which parameter in this embodiment is the voltage, one or more voltage pulses or burst will be applied, at step 96, in order to raise the voltage over the battery above the predetermined threshold level of the battery capacity parameter. As discussed above, the length of these pulses depends of, inter alia, the size of the charger, the type of the battery and the condition of the battery. Generally, a period is about 2-15 minutes and the voltage level is preferably 12.6-13 V. As alternative, the pulses can be applied during a predetermined period of time. This window charging period is maintained until the battery is used or that is turned of manually by a user of the battery charger. The skilled person in the art realizes that there are a number of conceivable alternatives to the above described method for maintenance charging of a battery. For example, the battery capacity parameter can be the current instead of the voltage. The modifications required to the circuits of the charger in order to adapt it to current monitoring are easily carried out by a person skilled in the art. Furthermore, a normal charging cycle, see FIG. 2a, can be initiated when the level of battery capacity parameter falls below the predetermined threshold level instead of window charging.

Although specific embodiments have been shown and described herein for purposes of illustration and exemplification, it is understood by those of ordinary skill in the art that the specific embodiments shown and described may be substituted for a wide variety of alternative and/or equivalent implementations without departing from the scope of the invention. Those of ordinary skill in the art will readily appreciate that the present invention could be implemented in a wide variety of embodiments, including hardware and software implementations, or combinations thereof. As an example, many of the functions described above may be obtained and carried out by suitable software comprised in a micro-chip or the like data carrier. This application is intended to cover any adaptations or variations of the preferred embodiments discussed herein. Consequently, the present invention is defined by the wording of the appended claims and equivalents thereof.

The invention claimed is:

1. Method of charging a lead acid battery at a battery charger connectable to the terminals of the lead acid battery to be charged, the battery charger being configured to detect a voltage over the terminals of a connected lead acid battery and having a control circuit, for initiating a burst cycle, the method comprising the following steps:
  applying a voltage at a connected lead acid battery;
  detecting the voltage over the connected lead acid battery to sense an increase of voltage over said lead acid battery in order to identify whether the internal resistance of the lead acid battery has increased compared to a normal state;
  initiating a burst cycle if said internal resistance is identified as increased, wherein a plurality of consecutive voltage bursts are applied to a connected lead acid battery to be charged, each burst having a length of at least an order of milliseconds (mS) and each burst delivering an amount of charge to the lead acid battery and thereby successively lowering the internal resistance of the lead acid battery; and
  initiating a charging cycle to charge the connected lead acid battery when said burst cycle has been terminated.

2. Method according to claim 1, wherein each burst has a length within a range from about 50 mS to several seconds.

3. Method according to claim 1, wherein the step of initiating a burst cycle further comprises the steps of:
  applying a voltage burst to the lead acid battery when said voltage over the battery has reached a first predetermined level;
  disconnecting said voltage burst when said voltage over the lead acid battery has reached a second predetermined level;
  re-applying said voltage burst to the battery when said voltage over the lead acid battery has reached the first predetermined level.

4. Method according to claim 1, wherein the step of initiating a burst cycle comprise the step of:
  applying said voltage bursts with a predetermined offset time between two consecutive bursts.

5. Computer readable medium comprising instructions for bringing a computer to perform a method according to claim 1.

6. A lead acid battery charger comprising:
power supply circuitry;
connectors connecting the power supply circuitry to output lines of the charger;
means for connecting the output lines to terminals of a lead acid battery to be charged;
measurement circuitry that detects a voltage over a connected lead acid battery; and
a control circuit connected to said measurement circuitry and being arranged to execute the methods according to any one of claims 1-4.

\* \* \* \* \*